(12) United States Patent
Sugiyama

(10) Patent No.: US 10,185,915 B2
(45) Date of Patent: Jan. 22, 2019

(54) ANALYSIS OF EVALUATIONS FROM INTERNET MEDIA

(71) Applicant: International Business Machines Corporation, Armonk, NY (US)

(72) Inventor: Yuji Sugiyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 14/554,487

(22) Filed: Nov. 26, 2014

(65) Prior Publication Data

US 2015/0170046 A1     Jun. 18, 2015

(30) Foreign Application Priority Data

Dec. 17, 2013     (JP) .................................. 2013-259902

(51) Int. Cl.
     *G06N 5/04*        (2006.01)

(52) U.S. Cl.
     CPC ............... *G06N 5/048* (2013.01); *G06N 5/04* (2013.01)

(58) Field of Classification Search
     CPC ....................................................... G06N 5/04
     USPC .......................................................... 706/46
     See application file for complete search history.

(56) References Cited

U.S. PATENT DOCUMENTS 7,822,631 B1    10/2010   Mey et al.

FOREIGN PATENT DOCUMENTS

| CN | 102693287 A | 9/2012 |
|----|-------------|--------|
| JP | H11328184 A | 11/1999 |
| JP | 2002132749 A | 5/2002 |
| JP | 2004185572 A | 7/2004 |
| JP | 2004240640 A | 8/2004 |
| JP | 2005078240 A | 3/2005 |
| JP | 2006004098 A | 1/2006 |
| JP | 2008165598 A | 7/2008 |

(Continued)

OTHER PUBLICATIONS

Online article "Is it me—or is it it? Attribution Theory", Mar. 1, 2012.*

(Continued)

*Primary Examiner* — Lut Wong
(74) *Attorney, Agent, or Firm* — Grant M. McNeilly

(57) ABSTRACT

Embodiments relate to supporting analysis of evaluations found on the internet. An aspect includes acquiring evaluation information comprising evaluations of each a first plurality of evaluation targets made by any of a plurality of evaluators. Another aspect includes generating consensus information regarding an evaluation of a predetermined evaluation target by determining a coincidence between a dispersion degree of evaluations with respect to the predetermined evaluation target and a central value of dispersion degrees of evaluations with respect to individual ones of the first plurality of evaluation targets. Another aspect includes generating distinctiveness information regarding the evaluations made by a predetermined evaluator by determining coincidence between a dispersion degree of evaluations made by the predetermined evaluator and a central value of dispersion degrees of evaluations made by individual ones of the plurality of evaluators. Yet another aspect includes outputting the consensus information and the distinctiveness information.

3 Claims, 18 Drawing Sheets

(56) References Cited

FOREIGN PATENT DOCUMENTS

| JP | 5008024 B2 | 8/2012 |
| JP | 2013508870 A | 3/2013 |
| WO | WO2006008919 A1 | 1/2006 |

OTHER PUBLICATIONS

Qiu et al ("Effects of conflicting aggregated rating on eWOM review credibility and diagnosticity: The moderating role of review valence" Sep. 2012).*

Ho et al ("Agent-based modelling to visualise trustworthiness: a socio-technical framework" 2013).*

Nakayma et al ("WOM or eWOM or Something Else: How Does the Web Affect Our Dependence on Shopping Information Sources?" 2010.*

Raja et al ("Review Analyzer: Analyzing Consumer Product Reviews from Review Collections 2012").*

Malle, B., "Attribution Theories: How People Make Sense of Behavior", Theories in social psychology, 2011, Wiley-Backwell, 25 pages.

Hewstone et al., "A re-examination of the roles of consensus, consistency and distinctiveness: Kelley's cube revisited", British Journal of Social Psychology, 1983, Printed in Great Britain, Copyright 1983 The British Psychological Society, 11 pages.

Gong et al., "Does Online Word-Of-Mouth Determine Product's Fate? An Empirical Analysis of Online Book Reviews", doc in, English Abstract Only, 1 page, printed Sep. 18, 2017, http://www.docin.com/p-463351330.html.

* cited by examiner

FIG. 6

| Consensus (ratio) | Distinctiveness (ratio) | Consistency (ratio) | External cause (likelihood) | Internal cause (likelihood) | Situational cause (type) | Rumor (likelihood) |
|---|---|---|---|---|---|---|
| High | High | High | High | Low | | Low |
| High | High | Low | | | Mode | (Local) |
| High | Low | High | Medium | Medium | | Medium |
| High | Low | Low | | Unknown | | Unknown |
| Low | High | High | High | High | | High |
| Low | High | Low | | | Time | (Temporary) |
| Low | Low | High | Low | High | | Highest |
| Low | Low | Low | | Unknown | | Unknown |

(a) Gradee ID: s1

| Grader ID | Score |
|---|---|
| u1 | p11 |
| u2 | p21 |
| u3 | p31 |

(b) Gradee ID: s2

| Grader ID | Score |
|---|---|
| u6 | p62 |

(c) Gradee ID: s3

| Grader ID | Score |
|---|---|
| u2 | p23_1 |
| u2 | p23_2 |
| u2 | p23_3 |
| u4 | p43_1 |
| u4 | p43_2 |
| u4 | p43_3 |

(d) Gradee ID: s4

| Grader ID | Score |
|---|---|
| u5 | p54 |

FIG. 12

(a) Grader ID: u1

| Gradee ID | Score |
|---|---|
| s1 | p11 |

(b) Grader ID: u2

| Gradee ID | Score |
|---|---|
| s1 | p21 |
| s3 | p23_1 |
| s3 | p23_2 |
| s3 | p23_3 |

(c) Grader ID: u3

| Gradee ID | Score |
|---|---|
| s1 | p31 |

(d) Grader ID: u4

| Gradee ID | Score |
|---|---|
| s3 | p43_1 |
| s3 | p43_2 |
| s3 | p43_3 |
| s5 | p45 |
| s6 | p46 |

(e) Grader ID: u5

| Gradee ID | Score |
|---|---|
| s4 | p54 |

(f) Grader ID: u6

| Gradee ID | Score |
|---|---|
| s2 | p62 |
| s5 | p65 |

| Consensus | Distinctiveness | Consistency | | | |
|---|---|---|---|---|---|
| | | s1 | s2 | s3 | s4 |
| | | Consensus(s1) | Consensus(s2) | Consensus(s3) | Consensus(s4) |
| u1 | Distinctiveness(u1) | Consistency(u1,s1) | Consistency(u1,s2) | Consistency(u1,s3) | Consistency(u1,s4) |
| u2 | Distinctiveness(u2) | Consistency(u2,s1) | Consistency(u2,s2) | Consistency(u2,s3) | Consistency(u2,s4) |
| u3 | Distinctiveness(u3) | Consistency(u3,s1) | Consistency(u3,s2) | Consistency(u3,s3) | Consistency(u3,s4) |
| u4 | Distinctiveness(u4) | Consistency(u4,s1) | Consistency(u4,s2) | Consistency(u4,s3) | Consistency(u4,s4) |
| u5 | Distinctiveness(u5) | Consistency(u5,s1) | Consistency(u5,s2) | Consistency(u5,s3) | Consistency(u5,s4) |
| u6 | Distinctiveness(u6) | Consistency(u6,s1) | Consistency(u6,s2) | Consistency(u6,s3) | Consistency(u6,s4) |

FIG. 18

| Analyze | Crawl | Admin | | | |
|---|---|---|---|---|---|
| Social Network Analyzer | | | | | |
| [Analyze] | Add | Edit | | Delete | |
| Analysis method | Site name | Evaluation target | | | |
| A | SNS1 | s1001 | | | |
| B | SNS2 | s1002 | | | |
| C | SNS3 | s1003 | | | |

Summary of Gradee Sample Group:

| Site Name | Sample Total | Average | Variance |
|---|---|---|---|
| SNS3 | 4 | 64.71875 | 630.96484 |

Summary of Grader Sample Group:

| Site Name | Sample Total | Average | Variance |
|---|---|---|---|
| SNS3 | 5 | 67.49286 | 680.42834 |

Gradee:

| Gradee ID | Grader Total | Average | Variance |
|---|---|---|---|
| s1003 | 5 | 91.875 | 80.859375 |

Graders:

| Grader ID | Gradee Total | Average | Variance | Consensus | Distinctiveness | Consistency |
|---|---|---|---|---|---|---|
| u1001 | 4 | 68.0 | 406.0 | 12.815195 | 59.668297 | 0.0 |
| u1002 | 4 | 61.25 | 592.1875 | | 87.03157 | 0.0 |
| u1003 | 4 | 62.5 | 481.25 | | 70.72751 | 0.0 |
| u1004 | 4 | 60.714287 | 1810.2041 | | 266.0389 | 0.34526494 |
| u1005 | 4 | 85.0 | 112.5 | | 16.533703 | 0.0 |

ANALYSIS OF EVALUATIONS FROM INTERNET MEDIA

BACKGROUND

The present disclosure relates generally to internet media, and more specifically, to analysis of evaluations from internet media.

The present invention relates to an apparatus and method for supporting analysis of evaluations. In particular, the present invention relates to an apparatus and method for supporting analysis of evaluations found on internet media.

Currently, on the internet, evaluations of various objects are written into internet media such as electronic bulletin boards, blogs, SNS (Social Networking Service) sites, and news site comment fields. Such evaluations can be analyzed by crawling data on the internet media using a text mining tool.

SUMMARY

Embodiments relating to supporting analysis of evaluations found on the internet. An aspect includes acquiring evaluation information comprising evaluations of each a first plurality of evaluation targets made by any of a plurality of evaluators evaluating any of the first plurality of evaluation targets, and evaluations made by each of the plurality of evaluators with respect to evaluation targets out of a second plurality of evaluation targets evaluated by any of the plurality of evaluators, wherein a number of the second plurality of evaluation targets is greater than or equal to a number of the first plurality of evaluation targets. Another aspect includes generating consensus information regarding an evaluation of a predetermined evaluation target by determining a coincidence between a dispersion degree of evaluations with respect to the predetermined evaluation target and a central value of dispersion degrees of evaluations with respect to individual ones of the first plurality of evaluation targets based on the evaluation information. Another aspect includes generating distinctiveness information regarding the evaluations made by a predetermined evaluator by determining coincidence between a dispersion degree of evaluations made by the predetermined evaluator and a central value of dispersion degrees of evaluations made by individual ones of the plurality of evaluators based on the evaluation information. Yet another aspect includes outputting the consensus information and the distinctiveness information.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DRAWINGS

Various embodiments will now be described, by way of example only, with reference to the following drawings in which:

FIG. 6 is a diagram showing an example of correspondence between combinations of consensus, distinctiveness, and consistency levels and causes of evaluations;

FIG. 12 is diagrams showing an example of first grading information stored in a database by the crawler in an embodiment;

FIG. 13 is diagrams showing an example of second grading information stored in the database by the crawler in an embodiment;

FIG. 17 is a diagram showing an example of a data structure used by the server to store values which represent consensus, distinctiveness, and consistency according to an embodiment; and FIG. 18 is a diagram showing an example of a screen used by the server to display values which represent consensus, distinctiveness, and consistency according to an embodiment.

DETAILED DESCRIPTION

Figure 1:
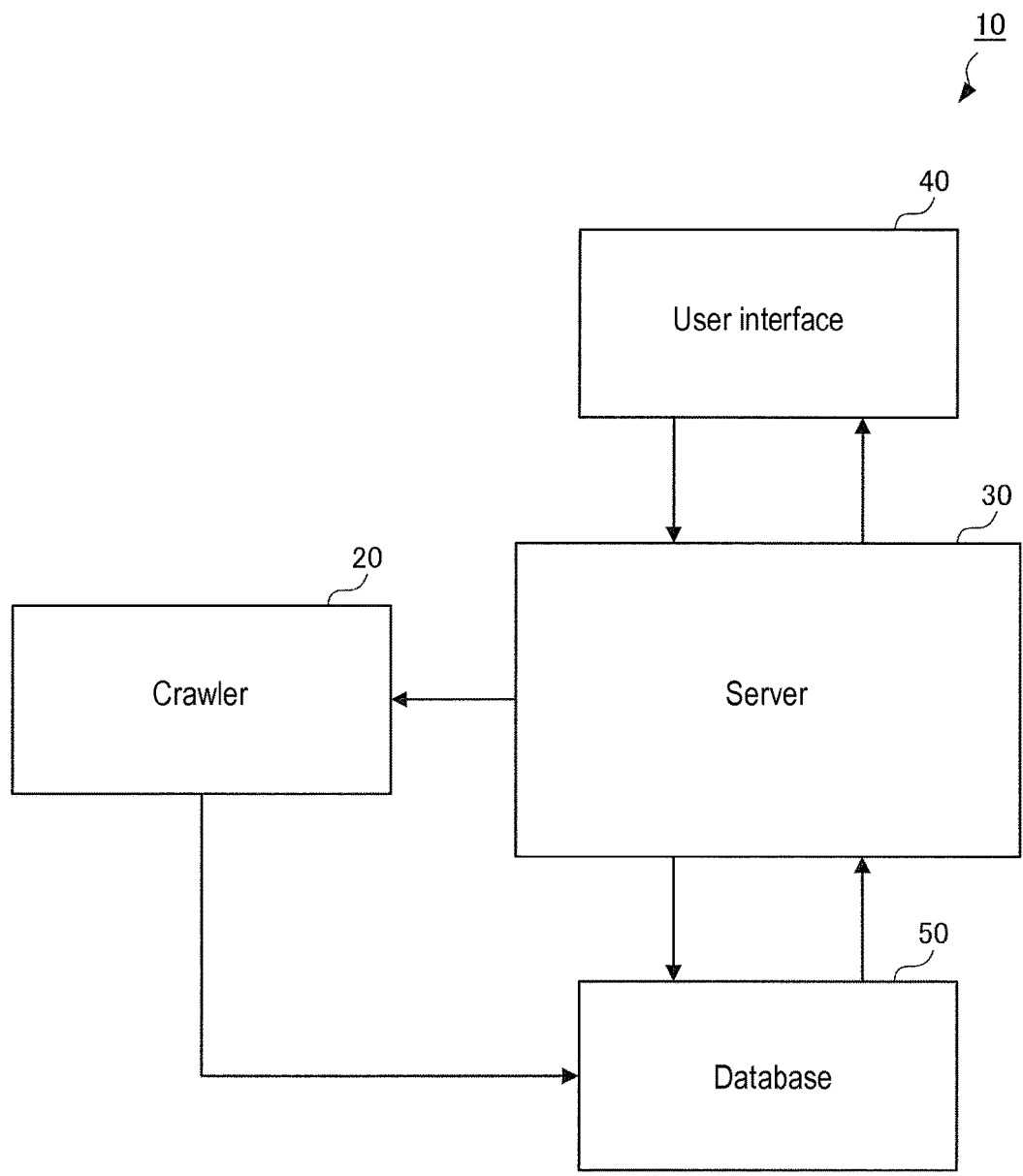
FIG. 1 is a block diagram showing an overall configuration example of a reputation analysis apparatus according to an embodiment.

Analysis of evaluations found on internet media have been able to be made conventionally. However, what appears to be a rumor is sometimes mixed in those evaluations. That is, remarks on the internet include not only remarks made because there is something to say about objects, but also remarks made for the sake of sheer amusement or remarks evoked by a way of putting things peculiar to a speaker.

When an evaluation which appears to be a rumor is mixed, evaluation analysis can be performed using a social-psychological theory, but a technique for analyzing evaluations found on internet media using a social-psychological theory has not been established yet. Suppose, one tries to analyze the evaluations found on internet media using a social-psychological theory, it is necessary to be able to efficiently process enormous amounts of data on the internet media. That is, under the present circumstances, evaluations found on internet media cannot be analyzed efficiently.

An object of various embodiments is to make it possible to analyze evaluations found on internet media accurately and efficiently even if an evaluation which appears to be a rumor is included.

Embodiments provide an apparatus for supporting analysis of evaluations found on internet media, including: an acquisition unit adapted to acquire evaluation information from data which represents evaluations of a plurality of evaluation targets on the internet media made by a plurality of evaluators, the evaluation information including evaluations of each of N (N is a natural number) evaluation targets made by evaluators out of M (M is a natural number) evaluators evaluating any of the N evaluation targets, and evaluations made by each of the M evaluators with respect to evaluation targets out of L (L is an integer equal to or larger than N) evaluation targets evaluated by any of the M evaluators; a first generating unit adapted to generate consensus information about consensus on the evaluation of a predetermined evaluation target by determining coincidence between a dispersion degree of evaluations with respect to the predetermined evaluation target and a central value of dispersion degrees of evaluations with respect to individual ones of the N evaluation targets based on the evaluation information; a second generating unit adapted to generate distinctiveness information about distinctiveness of the evaluations made by a predetermined evaluator by determining coincidence between a dispersion degree of evaluations made by the predetermined evaluator and a central value of dispersion degrees of evaluations made by individual ones of the M evaluators based on the evaluation information; and an output unit adapted to output the consensus information and the distinctiveness information. In this case, the output unit may further output cause information which represents a cause of the evaluation of the predetermined evaluation target made by the predetermined evaluator, the cause of the evaluation being defined in advance for a combination of the consensus represented by the consensus information and the distinctiveness represented by the distinctiveness information.

The apparatus may further include a third generating unit adapted to generate consistency information about consistency of the evaluations of the predetermined evaluation target made by the predetermined evaluator by determining coincidence between a dispersion degree of evaluations of the predetermined evaluation target made by the predetermined evaluator and a dispersion degree of evaluations of the evaluation targets evaluated by the predetermined evaluator out of the L evaluation targets of the predetermined evaluator, based on the evaluation information. In this case, the output unit may further output cause information which represents a cause of the evaluation of the predetermined evaluation target made by the predetermined evaluator, the cause of the evaluation being defined in advance for a combination of the consensus represented by the consensus information, the distinctiveness represented by the distinctiveness information, and the consistency represented by the consistency information. Also, the output unit may output information that there is a low likelihood that the cause of the evaluation of the predetermined evaluation target made by the predetermined evaluator is a rumor, as the cause information when a level of the consensus represented by the consensus information, a level of the distinctiveness represented by the distinctiveness information, and a level of the consistency represented by the consistency information are higher than respective thresholds and may output information that there is a high likelihood that the cause of the evaluation of the predetermined evaluation target made by the predetermined evaluator is a rumor, as the cause information when the level of the consensus represented by the consensus information is lower than the threshold, the level of the distinctiveness represented by the distinctiveness information is lower than the threshold, and the level of the consistency represented by the consistency information is higher than the threshold.

Also, embodiments provide an apparatus for supporting analysis of evaluations found on internet media, including: a first acquisition unit adapted to acquire first evaluation information from evaluation data which represents evaluations of a plurality of evaluation targets made by a plurality of evaluators on the internet media, the first evaluation information representing evaluations of each of N (N is a natural number) evaluation targets made by evaluators out of M (M is a natural number) evaluators evaluating any of the N evaluation targets; a second acquisition unit adapted to acquire second evaluation information from the evaluation data, the second evaluation information representing evaluations made by each of the M evaluators with respect to evaluation targets other than the N evaluation targets evaluated by each of the evaluators out of L (L is an integer equal to or larger than N) evaluation targets evaluated by any of the M evaluators; a first generating unit adapted to generate consensus information about consensus on the evaluation of a predetermined evaluation target based on the first evaluation information, the consensus being expressed by a ratio of variance of the evaluations of the predetermined evaluation target to an average variance of evaluations of individual ones of the N evaluation targets; a second generating unit adapted to generate distinctiveness information about distinctiveness of the evaluations made by the predetermined evaluator based on the first evaluation information and the second evaluation information, the distinctiveness being expressed by a ratio of variance of the evaluations made by the predetermined evaluator to an average variance of evaluations made by individual ones of the M evaluators; a third generating unit adapted to generate consistency information about consistency of evaluations of the predetermined evaluation target made by the predetermined evaluator based on the first evaluation information and the second evaluation information, the consistency being expressed by a ratio of variance of the evaluation of the predetermined evaluation target made by the predetermined evaluator to variance of evaluations of the evaluation targets evaluated by the predetermined evaluator out of the L evaluation targets of the predetermined evaluator; and an output unit adapted to output the consensus information, the distinctiveness information, and the consistency information.

Furthermore, embodiments provide a method for supporting analysis of evaluations found on internet media, including the blocks of: acquiring evaluation information from data which represents evaluations of a plurality of evaluation targets made by a plurality of evaluators on the internet media, the evaluation information including evaluations of each of N (N is a natural number) evaluation targets made by evaluators out of M (M is a natural number) evaluators evaluating any of the N evaluation targets, and evaluations made by each of the M evaluators with respect to evaluation targets out of L (L is an integer equal to or larger than N) evaluation targets evaluated by any of the M evaluators; generating consensus information about consensus on the evaluation of a predetermined evaluation target by determining coincidence between a dispersion degree of evaluations with respect to the predetermined evaluation target and a central value of dispersion degrees of evaluations with respect to individual ones of the N evaluation targets based on the evaluation information; generating distinctiveness information about distinctiveness of the evaluations made by a predetermined evaluator by determining coincidence between a dispersion degree of evaluations made by the predetermined evaluator and a central value of dispersion degrees of evaluations made by individual ones of the M evaluators based on the evaluation information; and outputting the consensus information and the distinctiveness information.

Furthermore, embodiments provide a program configured to cause a computer to function as an apparatus for supporting analysis of evaluations found on internet media, the computer being caused to function as: an acquisition unit adapted to acquire evaluation information from data which represents evaluations of a plurality of evaluation targets made by a plurality of evaluators on the internet media, the evaluation information including evaluations of each of N (N is a natural number) evaluation targets made by evaluators out of M (M is a natural number) evaluators evaluating any of the N evaluation targets, and evaluations made by each of the M evaluators with respect to evaluation targets out of L (L is an integer equal to or larger than N) evaluation targets evaluated by any of the M evaluators; a first generating unit adapted to generate consensus information about consensus on the evaluation of a predetermined evaluation target by determining coincidence between a dispersion degree of evaluations with respect to the predetermined evaluation target and a central value of dispersion degrees of evaluations with respect to individual ones of the N evaluation targets based on the evaluation information; a second genegrading unit adapted to generate distinctiveness information about distinctiveness of the evaluations made by a predetermined evaluator by determining coincidence between a dispersion degree of evaluations made by the predetermined evaluator and a central value of dispersion degrees of evaluations made by individual ones of the M evaluators based on the evaluation information; and an output unit adapted to output the consensus information and the distinctiveness information.

Various embodiments make it possible to analyze evaluations found on internet media accurately and efficiently even if an evaluation which appears to be a rumor is included.

Various embodiments will be described in detail below with reference to the accompanying drawings. The present embodiment provides a reputation analysis apparatus adapted to analyze reputation on internet media. Note that although internet media are represented by SNS in the following description, this is not intended to exclude internet media (e.g., electronic bulletin boards, blogs, news sites, and the like) other than SNS.

FIG. 1 is a block diagram showing a functional configuration example of the reputation analysis apparatus 10 according to the present embodiment. As illustrated in FIG. 1, the reputation analysis apparatus 10 includes a crawler 20, a server 30, a user interface 40, and a database 50.

The crawler 20 crawls pages contained in an SNS site specified by the server 30 and thereby acquires information obtained by numerically scoring evaluations of a target on the SNS site. Types of SNS site include, for example, one on which targets are evaluated numerically and one on which targets are evaluated by selecting one of two opinions (e.g., "I thinks so" and "I do not think so"). With such types of SNS site, it is relatively easy to numerically score evaluations of targets. On the other hand, there is a type of SNS site on which targets are evaluated with words rather than numerically, and with such a type of SNS site, the evaluations of targets can be numerically scored by analyzing text using a text mining tool and converting positive expressions and negative expressions into numerical form. Hereinafter, the numerical scoring of evaluations will be referred to as "grading", the subject of an evaluation as a "grader", the target of an evaluation as a "gradee", and information obtained by numerically scoring evaluations as "grading information". The grading is an example of evaluation, grader is an example of an evaluator, gradee is an example of an evaluation target, and grading information is an example of evaluation information. When grading information is acquired, the crawler 20 stores the grading information in the database 50.

Based on the grading information stored in the database 50, the server 30 calculates values which represent consensus, distinctiveness, and consistency, as referred to in social psychology, from gradings given by graders to gradees, and stores the calculated values in the database 50. Also, on instructions from the user interface 40, the server 30 outputs all or part of the values which represent consensus, distinctiveness, and consistency from the database 50 to the user interface 40 or makes causal attributions as referred to in social psychology, based on the values which, being stored in the database 50, represent consensus, distinctiveness, and consistency and outputs results thus obtained to the user interface 40.

Figure 2:
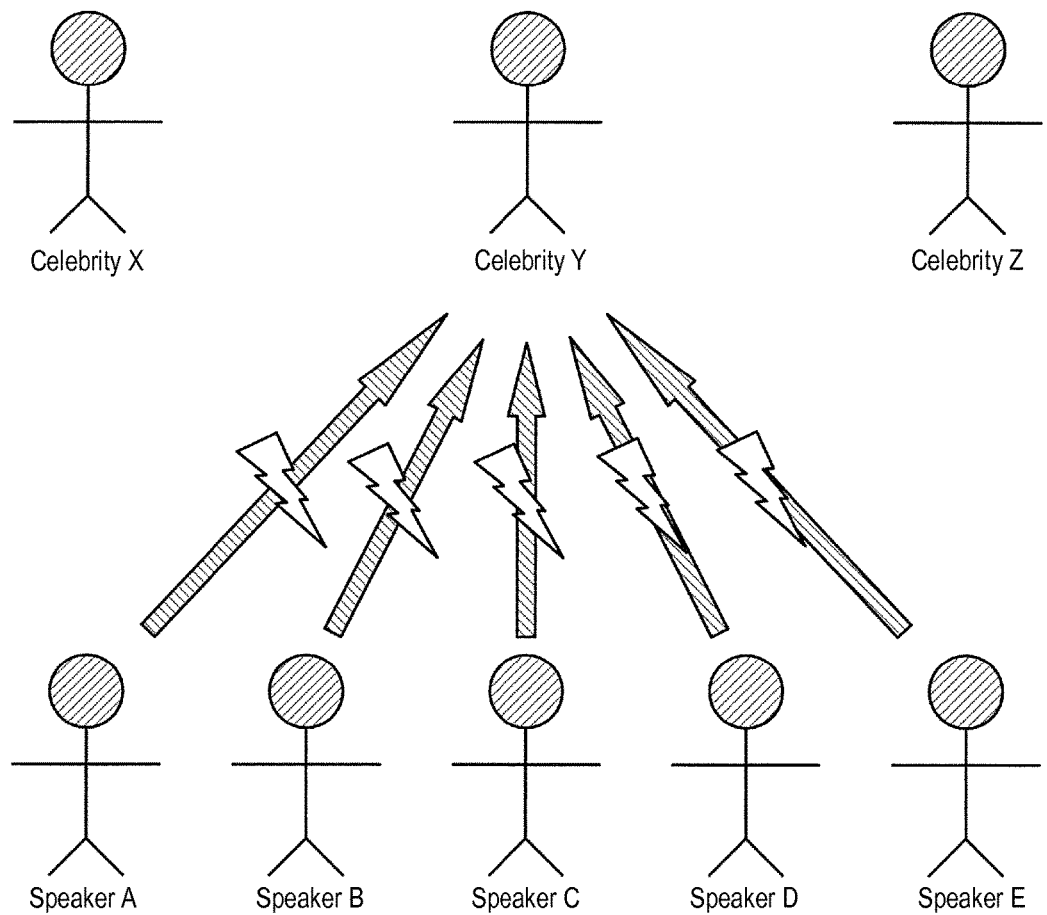
FIG. 2 is a diagram illustrating consensus.

First, consensus will be described. For example, as shown in FIG. 2, consider a case in which only celebrity Y is disliked by many people out of plural celebrities. In this case, it can be said that "there is a high degree of consensus" on the reputation of celebrity Y.

Figure 3:
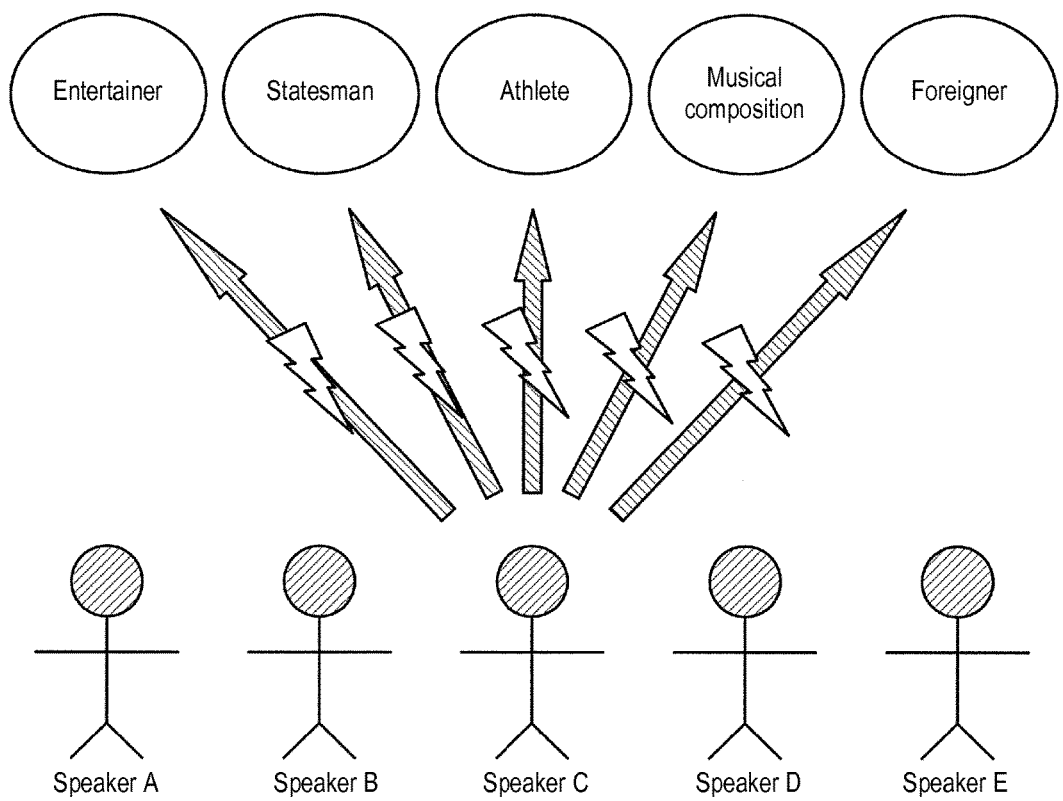
FIG. 3 is a diagram illustrating distinctiveness.

Next, distinctiveness will be described. For example, as shown in FIG. 3, consider a case in which only speaker C out of plural speakers makes critical remarks on any topic. In this case, it can be said that the remarks of speaker C are "low in distinctiveness".

Figure 4:
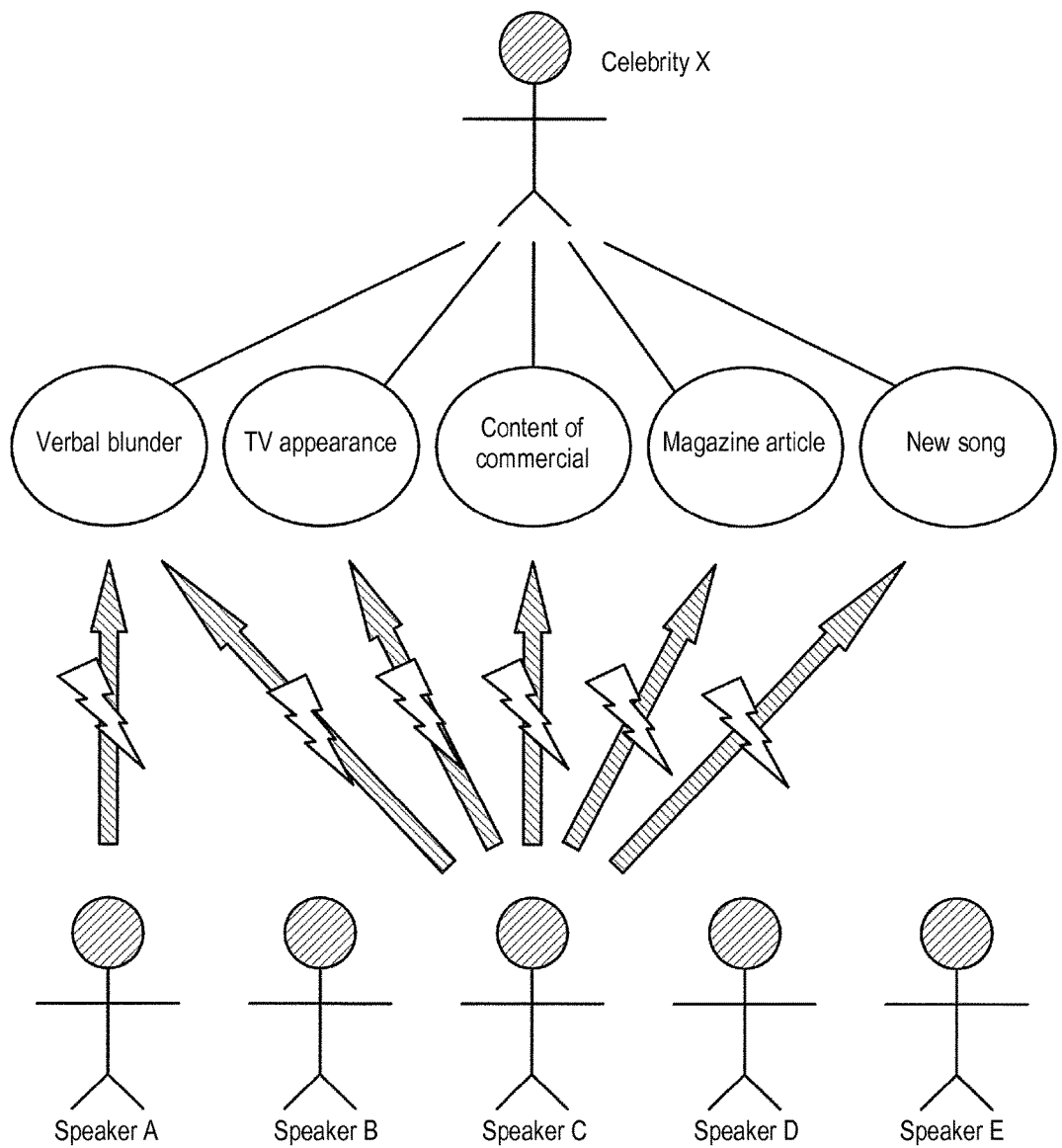
FIG. 4 is a diagram illustrating consistency.

Next, consistency will be described. For example, as shown in FIG. 4, consider a case in which whereas speaker A makes critical remarks on a verbal blunder of celebrity X, speaker C makes critical remarks toward celebrity X on any topic. In this case, the remarks of speaker A toward celebrity X is not consistently critical, and thus can be said to be "low in consistency". In contrast, the remarks of speaker C toward celebrity X is consistently critical, and thus can be said to be "high in consistency".

Next, causal attributions will be described. Here, attributions include an internal attribution and external attribution. The internal attribution attributes a cause to personality and the external attribution attributes a cause to circumstances. More specifically, the internal attribution attributes behavior to internal causes, i.e., an individual's character, attitudes, idiosyncrasy, and/or temperament. The external attribution attributes behavior to external causes, i.e., surrounding circumstances in which behavior occurs. Depending on which of the attributions is selected, totally different points of view on the individual is derived. Whether the cause of behavior is an internal cause or external cause is determined by comprehensively considering consensus, distinctiveness, and consistency. Also, in some cases, there are complex causes with an external cause and internal cause coexisting. Furthermore, there are cases in which causes lie in the situation (time or mode).

Figure 5:
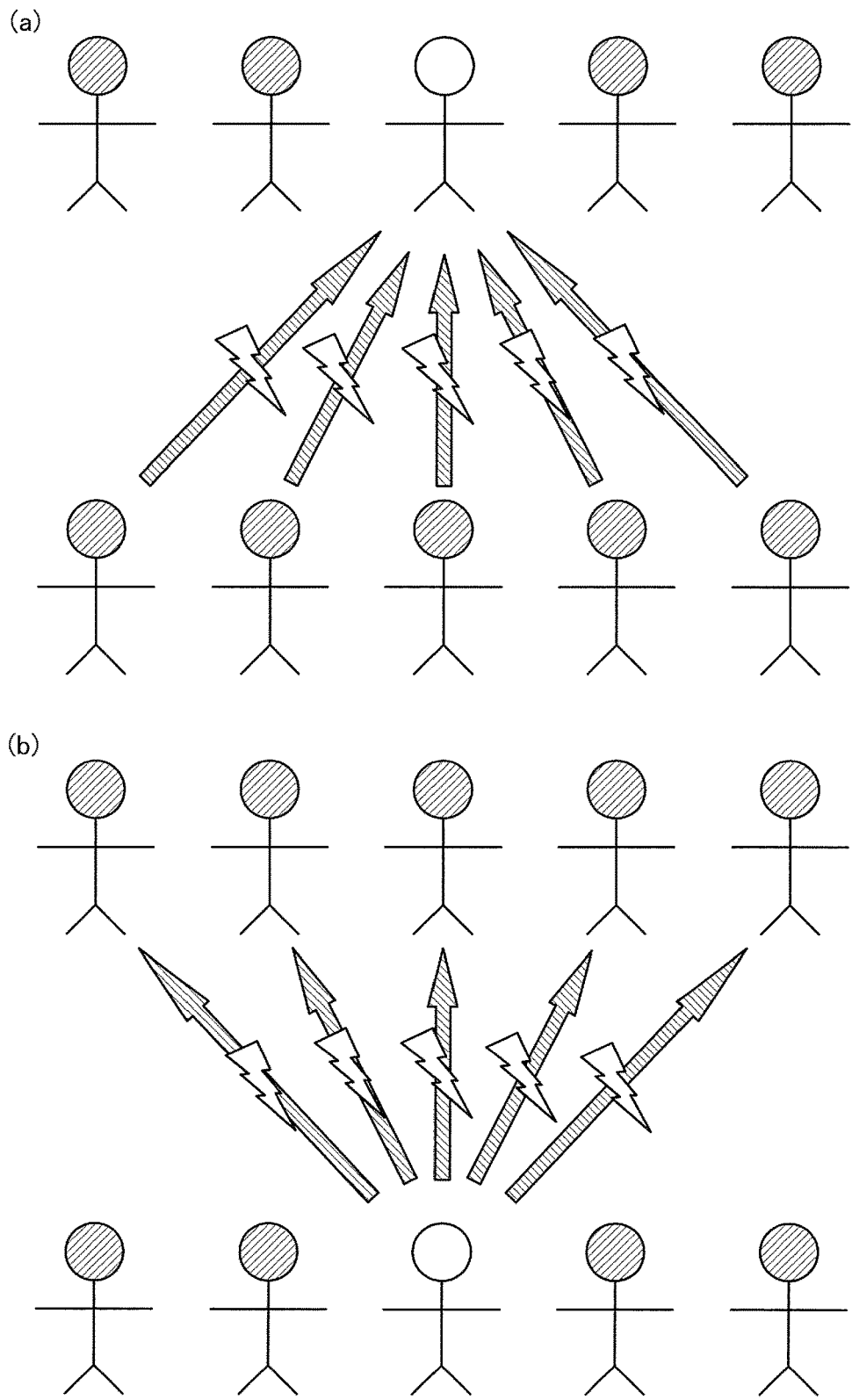
FIG. 5 is diagrams illustrating causal attribution.

For example, as shown in FIG. 5(a), it is likely that the cause whereby many people make critical remarks on a specific target is an external cause, and so it is considered that there is a problem with the target. Also, as shown in FIG. 5(b), certain remarks made by a person who makes critical remarks on everything is likely to have been caused by an internal cause, and so arguments of such a person are often unreliable.

That is, correspondence between combinations of consensus, distinctiveness, and consistency levels and attributable causes of reputation (which cause the reputation is attributed to, an internal cause, external cause, or situational cause) is as shown in FIG. 6. In FIG. 6, the attributable causes of reputation are further associated with whether or not the reputation is a rumor. According to the present embodiment, a difference between the reputation and rumor is defined as follows. That is, the reputation means various opinions about a certain target while the rumor means reputation attributable to an internal cause rather than an external cause. Also, it is assumed that an "original rumor" means a rumor with a low degree of consensus.

Note that the correspondence shown in FIG. 6 is for illustrative purposes only. An attribution theory has various variations even in social psychology, and thus there is no need to limit the correspondence to the one described above.

Figure 7:
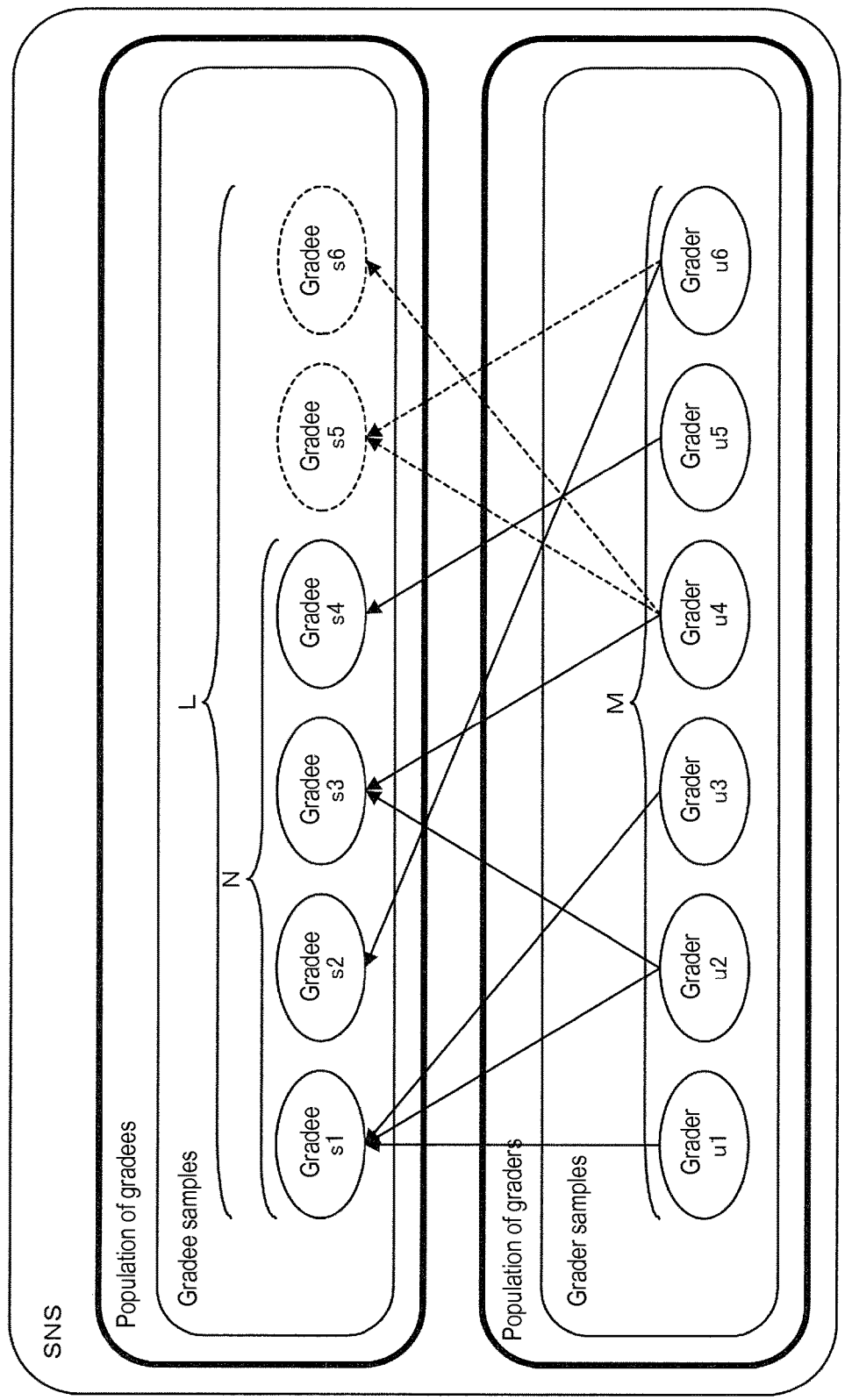
FIG. 7 is a diagram showing an example of relationship between gradees and graders on an SNS site.

FIG. 7 is a diagram showing an example of relationship between gradees and graders on an SNS site. As illustrated in FIG. 7, the SNS site has two types of populations: population of gradees and population of graders. The crawler 20 extracts gradee samples including N gradees from the population of gradees (N is a natural number). Also, from the population of graders, the crawler 20 also extracts grader samples including M graders who have graded any of the N gradees (M is a natural number). Furthermore, the graders rate L gradees (L is an integer equal to or larger than N). Consequently, variance of gradings for the N gradees can be acquired, and can be compared with variance of gradings for a given gradee to verify the consensus on the gradings for the given gradee. Also, variance of gradings by M graders can be acquired, and can be compared with variance of gradings by a given grader to verify distinctiveness of the gradings by the given grader.

Specifically, if the variance of the gradings for gradees si is assumed to be $S_{si}^2$, consensus Consensus(n) on the gradings for a given gradee sn is expressed by the following mathematical formula:

$$\text{Consensus } (n) = \frac{S_{sn}^2}{\sum_{i=1}^{N} S_{si}^2 / N} \times 100 \quad \text{(EQ. 1)}$$

That is, the consensus Consensus(n) herein is equal to a value obtained by dividing the variance of the gradings for the gradee sn by average variance of the gradings for all gradee samples.

The variance used in mathematical formula 1 may be either sample variance or population variance. Alternatively, anther index which represents a dispersion degree may be used instead of the variance. Also, anther central value may be used instead of the average value. Furthermore, the consensus may be expressed not only by a ratio obtained by dividing variance by the average value of variance, but also by anther index which represents coincidence between variance and average variance.

Also, if variance of gradings by graders uj is $S_{uj}^2$, distinctiveness Distinctiveness(m) of the gradings by a given grader um is expressed by the following mathematical formula:

$$\text{Distinctiveness } (m) = \frac{S_{um}^2}{\sum_{j=1}^{M} S_{uj}^2 / M} \times 100 \quad \text{(EQ. 2)}$$

That is, distinctiveness Distinctiveness(m) herein is equal to a value obtained by dividing the variance of the gradings given by the grader um by average variance of the gradings by all grader samples.

The variance used in mathematical formula 2 may be either sample variance or population variance. Alternatively, anther index which represents a dispersion degree may be used instead of the variance. Also, anther central value may be used instead of the average value. Furthermore, the distinctiveness may be expressed not only by a ratio obtained by dividing variance by the average value of variance, but also by anther index which represents coincidence between variance and average variance.

Other techniques for causal attribution analysis in social psychology include a technique which uses Kelley's Analysis of Variance Model. Kelley's Analysis of Variance Model assumes analysis mainly on an interpersonal level. On the other hand, in the present embodiment, since a large amount of data needs to be analyzed, Kelley's Analysis of Variance Model has been grasped anew on a social level, and consequently, definitions in Kelley's Analysis of Variance Model have been modified. In particular, the definition of distinctiveness differs from that in Kelley's Analysis of Variance Model. In Kelley's Analysis of Variance Model, distinctiveness is defined as "whether evaluation of a target made by a given person is particularly different from evaluation of another target made by the given person". That is, the definition is limited to a relationship between a certain person and a certain target. On the other hand, according to the present embodiment, the distinctiveness is defined as "how much more sharply contrasted the evaluation made by a given evaluator is than the evaluation made by all evaluator samples".

Furthermore, if variance of plural gradings given by the graders uj to the gradees si is c(j,i), consistency Consistency(m,n) of the grading given by a given grader um to a given gradee sn is expressed by the following mathematical formula.

$$\text{Consistency } (m, n) = \frac{c(m, n)}{S_{um}^2} \times 100 \quad \text{(EQ. 3)}$$

That is, the consistency Consistency(m,n) herein is equal to a value obtained by dividing the variance of plural gradings given by the grader um to the gradee sn by the variance of the gradings given by the grader um.

The variance used in mathematical formula 3 may be either sample variance or population variance. Alternatively, anther index which represents a dispersion degree may be used instead of the variance. Also, the consistency may be expressed not only by a ratio obtained by dividing variance concerning one gradee by variance concerning plural gradees, but also another index which represents coincidence between the former variance and latter variance.

Figure 8:
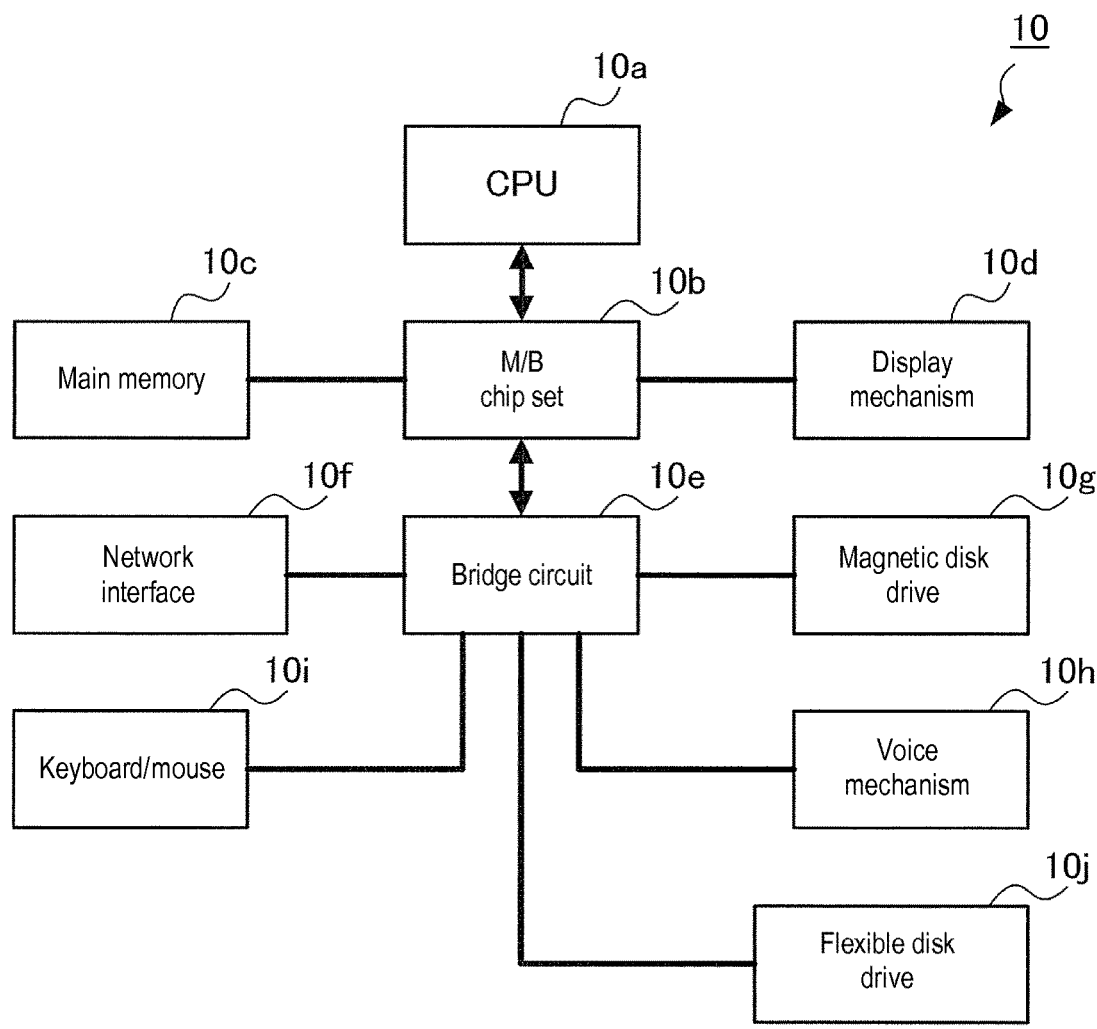
FIG. 8 is a diagram showing a hardware configuration example of a computer to which an embodiment is applicable.

FIG. 8 is a diagram showing a hardware configuration example of the reputation analysis apparatus 10 according to the present embodiment. As illustrated in FIG. 8, the reputation analysis apparatus 10 includes a CPU (Central Processing Unit) 10a which is a computing unit, a main memory 10c connected to the CPU 10a via a M/B (motherboard) chip set 10b, and a display mechanism 10d similarly connected to the CPU 10a via the M/B chip set 10b. Also, the M/B chip set 10b is connected with a network interface 10f, a magnetic disk drive (HDD) 10g, a voice mechanism 10h, a keyboard/mouse 10i, and a flexible disk drive 10j via a bridge circuit 10e.

Note that in FIG. 8, components are interconnected via buses. For example, the CPU 10a and M/B chip set 10b as well as the M/B chip set 10b and main memory 10c are interconnected via a CPU bus. Also, the M/B chip set 10b and display mechanism 10d may be interconnected via an AGP (Accelerated Graphics Port), but when the display mechanism 10d includes a video card compatible with PCI Express, the M/B chip set 10b and video card is interconnected via a PCI Express (PCIe) bus. Also, when the network interface 10f is connected to the bridge circuit 10e, for example, PCI Express can be used for the network interface 10f. Regarding the magnetic disk drive 10g, serial ATA (AT Attachment), parallel transfer ATA, or PCI (Peripheral Components Interconnect) can be used, for example. Furthermore, regarding the keyboard/mouse 10i and flexible disk drive 10j, USB (Universal Serial Bus) can be used.

Although it has been stated that FIG. 8 shows a hardware configuration example of the reputation analysis apparatus 10, when processing part of the reputation analysis apparatus 10 is divided into the crawler 20 and server 30 as with FIG. 1. FIG. 8 can show a hardware configuration example of the crawler 20 and a hardware configuration example of the server 30. In that case, the display mechanism 10d, magnetic disk drive 10g, and keyboard/mouse 10i can be provided only in the hardware configuration example of the server 30 without providing the display mechanism 10d, magnetic disk drive 10g, and keyboard/mouse 10i in the hardware configuration example of the crawler 20. Then, the user interface 40 in FIG. 1 can be implemented by the display mechanism 10d and keyboard/mouse 10i and the database 50 in FIG. 1 can be implemented by the magnetic disk drive 10g.

Figure 9:
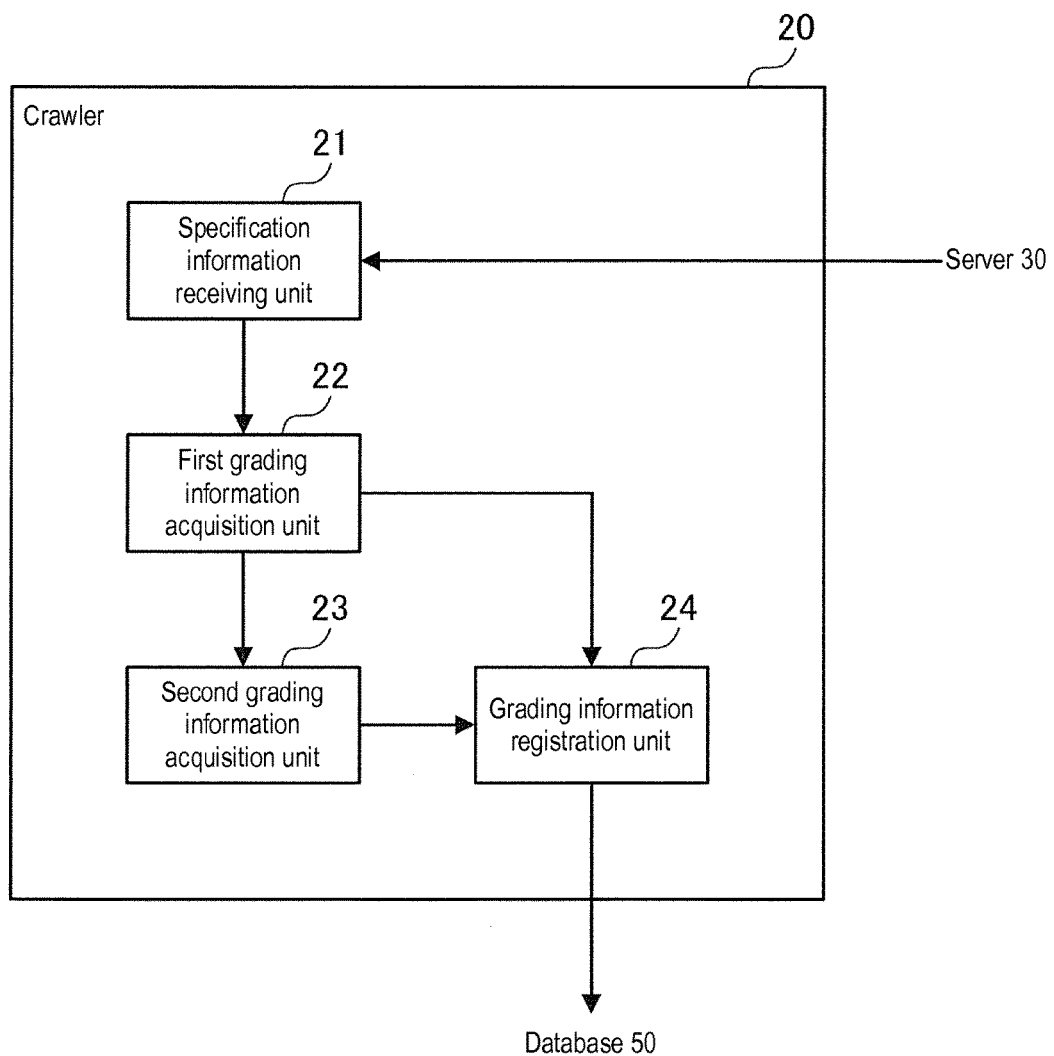
FIG. 9 is a block diagram showing a functional configuration example of a crawler included in the reputation analysis apparatus according to an embodiment.

FIG. 9 is a block diagram showing a functional configuration example of the crawler 20. As illustrated in FIG. 9, the crawler 20 includes a specification information receiving unit 21, a first grading information acquisition unit 22, a second grading information acquisition unit 23, and a grading information registration unit 24.

The specification information receiving unit 21 receives specification information from the server 30, where the specification information specifies an SNS site to be crawled and the number (denoted as N) of gradees to be analyzed on the SNS site.

By accessing a page of a gradee, the first grading information acquisition unit 22 acquires first grading information which represents the grading for the gradee. Specifically, when the specification information receiving unit 21 receives specification information, the N gradees specified in the specification information are selected from the gradees on the SNS site specified in the specification information, and pages of the N gradees are accessed. Then, the first grading information acquisition unit 22 acquires the first grading information for each of the N gradees by associating identification information (hereinafter referred to as a "grader ID") on the grader who has graded the gradee and a score given by the grader with identification information (hereinafter referred to as a "gradee ID") on the gradee. In the present embodiment, first grading information is used as an example of first evaluation information which represents evaluation of each of N evaluation targets made by an evaluator evaluating the evaluation targets. The first grading information acquisition unit 22 is provided as an example of a first acquisition unit adapted to acquire first evaluation information. Also, the first grading information is used as an example of that portion of evaluation information which represents evaluation of each of N evaluation targets made by an evaluator evaluating the evaluation targets, and the first grading information acquisition unit 22 is provided as an example of that function of an acquisition unit adapted to acquire the evaluation information which acquires the above-described portion.

By accessing pages of graders, the second grading information acquisition unit 23 acquires second grading information which represents the gradings by the graders. Specifically, the second grading information acquisition unit 23 identifies the M graders who have graded any of the N gradees and accesses the pages of the M graders. Then, the second grading information acquisition unit 23 acquires the second grading information for each of the M graders by associating the grader ID of the given grader with the gradee IDs and scores of the gradees graded by the given grader out of the gradees remaining after the N gradees are subtracted from the L gradees graded by any of the M graders. In the present embodiment, the second grading information is used as an example of second evaluation information which represents evaluations made by each of the M evaluators with respect to evaluation targets other than the N evaluation targets evaluated by each of the evaluators, and the second grading information acquisition unit 23 is provided as an example of a second acquisition unit adapted to acquire the second evaluation information. Alternatively, the second grading information acquisition unit 23 may acquire extended second grading information by accessing the pages of the graders. The extended second grading information here is obtained by associating the grader ID of a given grader with the gradee IDs and scores of the gradees graded by the given grader out of the L gradees without subtracting the N gradees from the L gradees graded by any of the M graders. In this case, the extended second grading information is used as an example of that portion of evaluation information which represents evaluations made by each of the M evaluators with respect to evaluation targets evaluated by any of the M evaluators, and the second grading information acquisition unit 23 is provided as an example of that function of an acquisition unit which acquires the above-described portion, the acquisition unit being adapted to acquire the evaluation information. Note that in the following description, only the extended second grading information can be referred to instead of referring to the first grading information and second grading information.

The grading information registration unit 24 registers the first grading information acquired by the first grading information acquisition unit 22 and the second grading information acquired by the second grading information acquisition unit 23 in the database 50.

Note that these functional units are implemented by software collaborating with hardware resources. Specifically, these functional units are implemented when the CPU 10a executes programs configured to implement the specification information receiving unit 21, first grading information acquisition unit 22, second grading information acquisition unit 23, and grading information registration unit 24 by loading the programs into the main memory 10c, for example, from the magnetic disk drive 10g.

Figure 10:
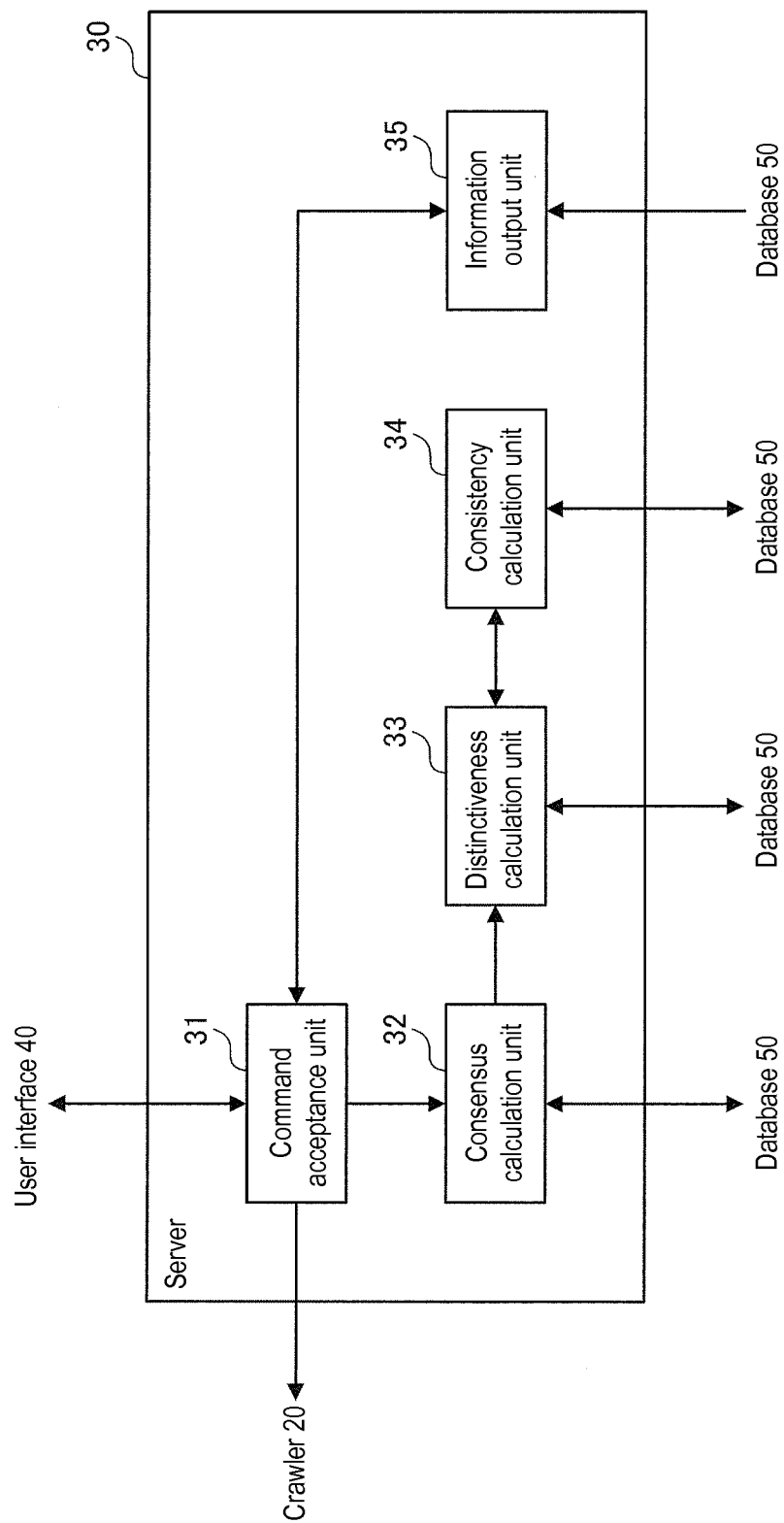
FIG. 10 is a block diagram showing a functional configuration example of a server included in the reputation analysis apparatus according to an embodiment.

FIG. 10 is a block diagram showing a functional configuration example of the server 30. As illustrated in FIG. 10, the server 30 includes a command acceptance unit 31, a consensus calculation unit 32, a distinctiveness calculation unit 33, a consistency calculation unit 34, and an information output unit 35.

The command acceptance unit 31 accepts any of a crawl command, analysis command, and information output command from the user interface 40. When a crawl command is accepted, the command acceptance unit 31 transmits specification information to the specification information receiving unit 21 of the crawler 20, specifying the SNS site to be crawled and the number N of gradees to be analyzed on the SNS site. When an analysis command is accepted, the command acceptance unit 31 instructs the consensus calculation unit 32 to calculate a value which represents consensus, and when an information output command is accepted, the command acceptance unit 31 instructs the information output unit 35 to output information based on analysis.

Based on the first grading information stored in the database 50, the consensus calculation unit 32 calculates a value which represents consensus on the grading for the N gradees. Specifically, the consensus calculation unit 32 calculates the value which represents consensus according to mathematical formula 1 described above. Then, the value which represents consensus is stored in the database 50. In the present embodiment, the consensus calculation unit 32 is provided as an example of a first generating unit adapted to generate consensus information about consensus on the evaluation of a predetermined evaluation target. Also, a function of the consensus calculation unit 32 to write the value which represents consensus into the database 50 may be seen as an example of the information output unit 35.

Based on the first grading information and second grading information stored in the database 50, the distinctiveness calculation unit 33 calculates the value which represents distinctiveness of the gradings by the M graders. Specifically, the distinctiveness calculation unit 33 calculates the value which represents distinctiveness according to mathematical formula 2 described above. Then, the value which represents distinctiveness is stored in the database 50. In the present embodiment, the distinctiveness calculation unit 33 is provided as an example of a second generating unit adapted to generate distinctiveness information about distinctiveness of the evaluations made by the predetermined evaluator. Also, a function of the distinctiveness calculation unit 33 to write the value which represents distinctiveness into the database 50 may be seen as an example of the information output unit 35.

Based on the first grading information and second grading information stored in the database 50, the consistency calculation unit 34 calculates the value which represents consistency of gradings for a given one of the N gradees graded by a given one of the M graders. Specifically, the consistency calculation unit 34 calculates the value which represents consistency according to mathematical formula 3 described above. Then, the value which represents consistency is stored in the database 50. In the present embodiment, the consistency calculation unit 34 is provided as an example of a third generating unit adapted to generate consistency information about consistency of evaluations of the predetermined evaluation target made by the predetermined evaluator. Also, a function of the consistency calculation unit 34 to write the value which represents consistency into the database 50 may be seen as an example of the information output unit 35.

Based on the values which represent consensus, distinctiveness, and consistency and are stored in the database 50, the information output unit 35 generates the information as instructed by the command acceptance unit 31 and outputs the generated information to the user interface 40. For example, when a gradee is specified via the user interface 40, the information output unit 35 outputs the value which represents consensus on the grading for the gradee, the value which represents distinctiveness of gradings by the graders who have graded the gradee, and the value which represents consistency of the gradings for the gradee graded by the graders who have graded the gradee to the user interface 40. In the present embodiment, the information output unit 35 is provided as an example of an output unit adapted to output the consensus information and the distinctiveness information and as an example of an output unit adapted to output the consensus information, the distinctiveness information, and the consistency information. Alternatively, the information output unit 35 may acquire information which represents the cause of grading given by the graders to the gradee (which cause the grading is attributed to, an internal cause, external cause, or situational cause; and whether or not the grading is attributed to a rumor) with reference to FIG. 6, and output the information to the user interface 40. In this case, the information which represents the cause of grading given by the graders to the gradee (which cause the grading is attributed to, an internal cause, external cause, or situational cause; and whether or not the grading is attributed to a rumor) is used as an example of cause information which represents the cause of evaluation, and the information output unit 35 is provided as an example of an output unit adapted to output the cause information.

Note that these functional units are implemented by software collaborating with hardware resources. Specifically, these functional units are implemented when the CPU 10$a$ executes programs configured to implement the command acceptance unit 31, consensus calculation unit 32, distinctiveness calculation unit 33, consistency calculation unit 34, and information output unit 35 by loading the programs into the main memory 10$c$, for example, from the magnetic disk drive 10$g$.

Figure 11:
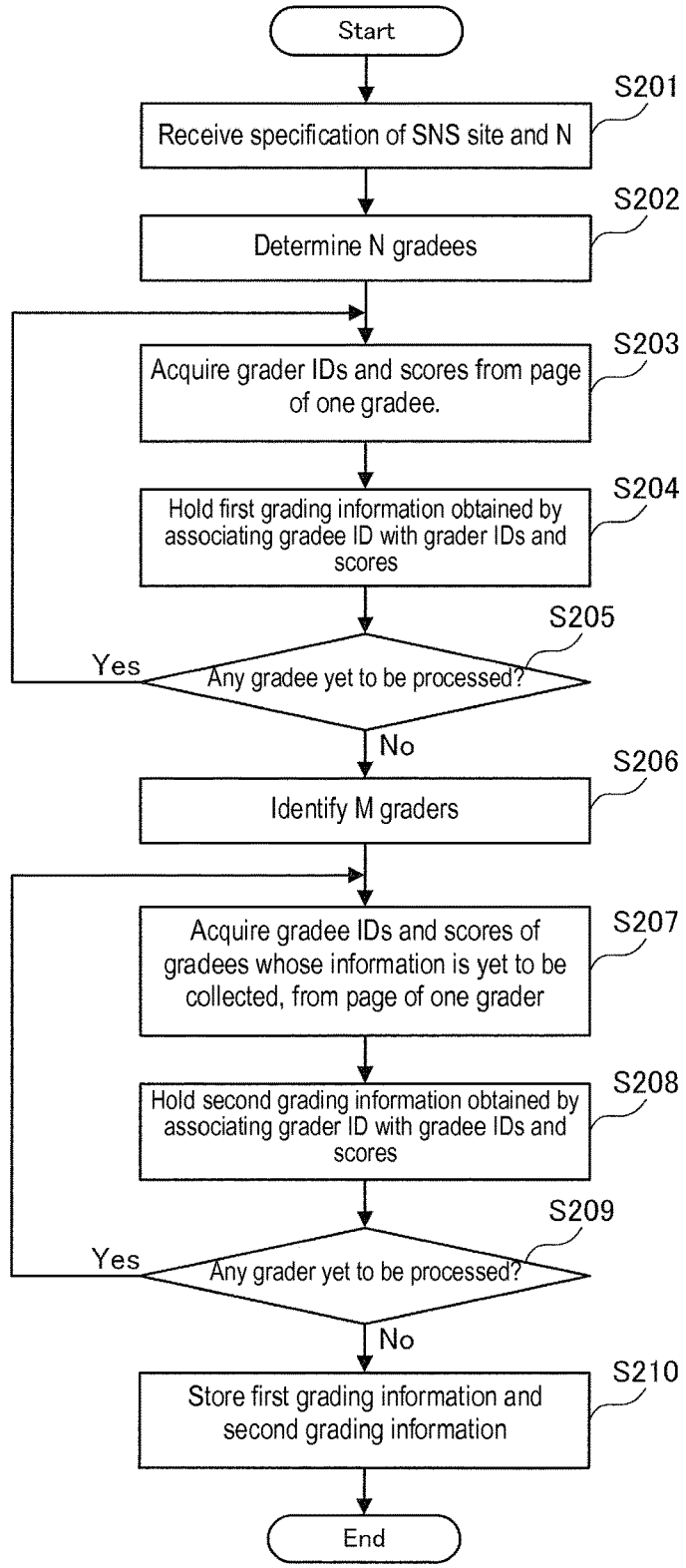
FIG. 11 is a flowchart showing an operation example of the crawler included in the reputation analysis apparatus according to an embodiment.

FIG. 11 is a flowchart showing an operation example of the crawler 20. Note that this operation is started when the user interface 40 of the server 30 accepts a crawl command and transmits command information to the crawler 20, specifying the SNS site to be crawled and the number N of gradees to be analyzed on the SNS site.

When the operation starts, the specification information receiving unit 21 receives, from the server 30, the command information which specifies the SNS site to be crawled and the number N of gradees to be analyzed (block 201).

Then, the first grading information acquisition unit 22 determines N gradees by selecting from among all the gradees at the SNS site (block 202). Consequently, the first grading information acquisition unit 22 notes one of the N gradees, and acquires the grader IDs of the graders who has graded the gradee and the scores given by the graders from the page of the gradee (block 203). Then, the first grading information acquisition unit 22 associates the gradee ID of the noted gradee with the grader IDs and scores acquired in block 203, and holds the resulting information as first grading information on the gradee (block 204). Subsequently, the first grading information acquisition unit 22 determines whether any of the N gradees is yet to be processed (block 205), and if there is any gradee yet to be processed, the processing returns to block 203, but if there is no gradee yet to be processed, the processing advances to block 206.

Next, the second grading information acquisition unit 23 identifies M graders whose grader IDs are contained in the first grading information acquired by the first grading information acquisition unit 22 (block 206). Consequently, the second grading information acquisition unit 23 notes one of the M graders and acquires, from the page of the grader, the gradee IDs of the gradees graded by the grader but not included in the N gradees and the scores given to the gradees by the grader (block 207). Then, the second grading information acquisition unit 23 associates the grader ID of the noted grader with the gradee IDs and scores acquired in block 207, and holds the resulting information as second grading information on the grader (block 208). Subsequently, the second grading information acquisition unit 23 determines whether any of the M graders is yet to be processed (block 209), and if there is any grader yet to be processed, the processing returns to block 207, but if there is no grader yet to be processed, the processing advances to block 210.

Finally, the first grading information held in block 204 and the second grading information held in block 208 are stored in the database 50 (block 210) by the grading information registration unit 24.

FIG. 12 shows diagrams 12(a)-12(d) showing an example of first grading information stored in the database 50. If there is a relationship such as shown in FIG. 7 between graders and gradees on an SNS site, the first grading information such as shown here is stored. For example, information about gradings given by graders u1, u2, and u3 are stored in relation to a gradee s1 as shown in FIG. 12(a), and information about a grading given by a grader u6 is stored in relation to a gradee s2 as shown in FIG. 12(b).

FIG. 13 shows diagrams 13(a)-13(f) showing an example of second grading information stored in the database 50. However, extended second grading information including the second grading information is shown here for ease of subsequent explanation. That is, the second grading information is shown by being surrounded by dashed lines, together with information obtained by reorganizing the first grading information of FIGS. 12(a) to 12(d) on a grader by grader basis. If there is a relationship such as shown in FIG. 7 between graders and gradees on an SNS site, the second grading information such as shown here is stored. For example, information about gradings given to gradees s5 and s6 are stored in relation to a grader u4 as shown in FIG. 13(d), and information about a grading given to the gradee s5 is stored in relation to a grader u6 as shown in FIG. 13(f).

Figure 14:
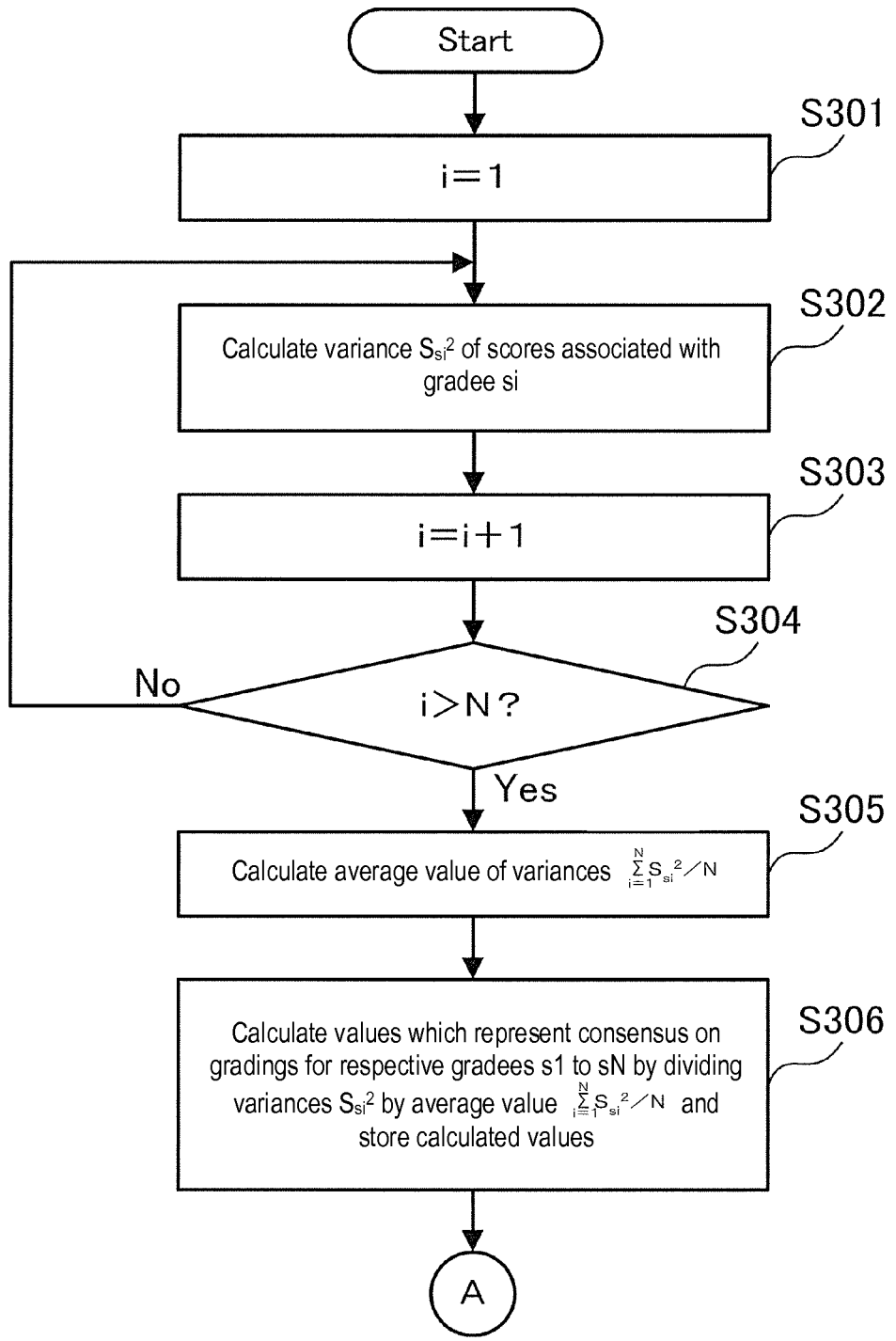
FIG. 14 is a flowchart showing an operation example of the server included in the reputation analysis apparatus according to an embodiment.
Figure 15:
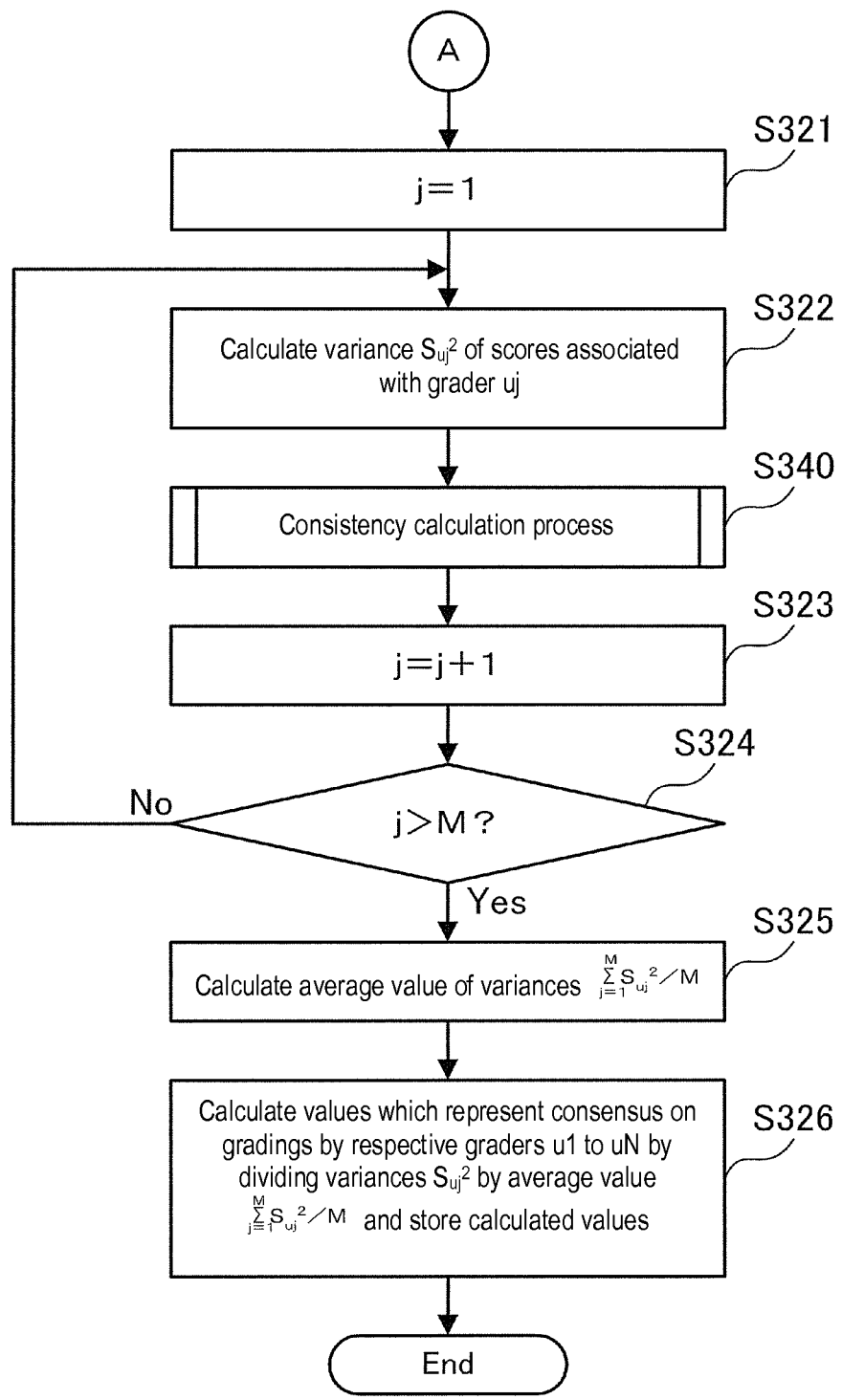
FIG. 15 is a flowchart showing an operation example of the server included in the reputation analysis apparatus according to an embodiment.
Figure 16:
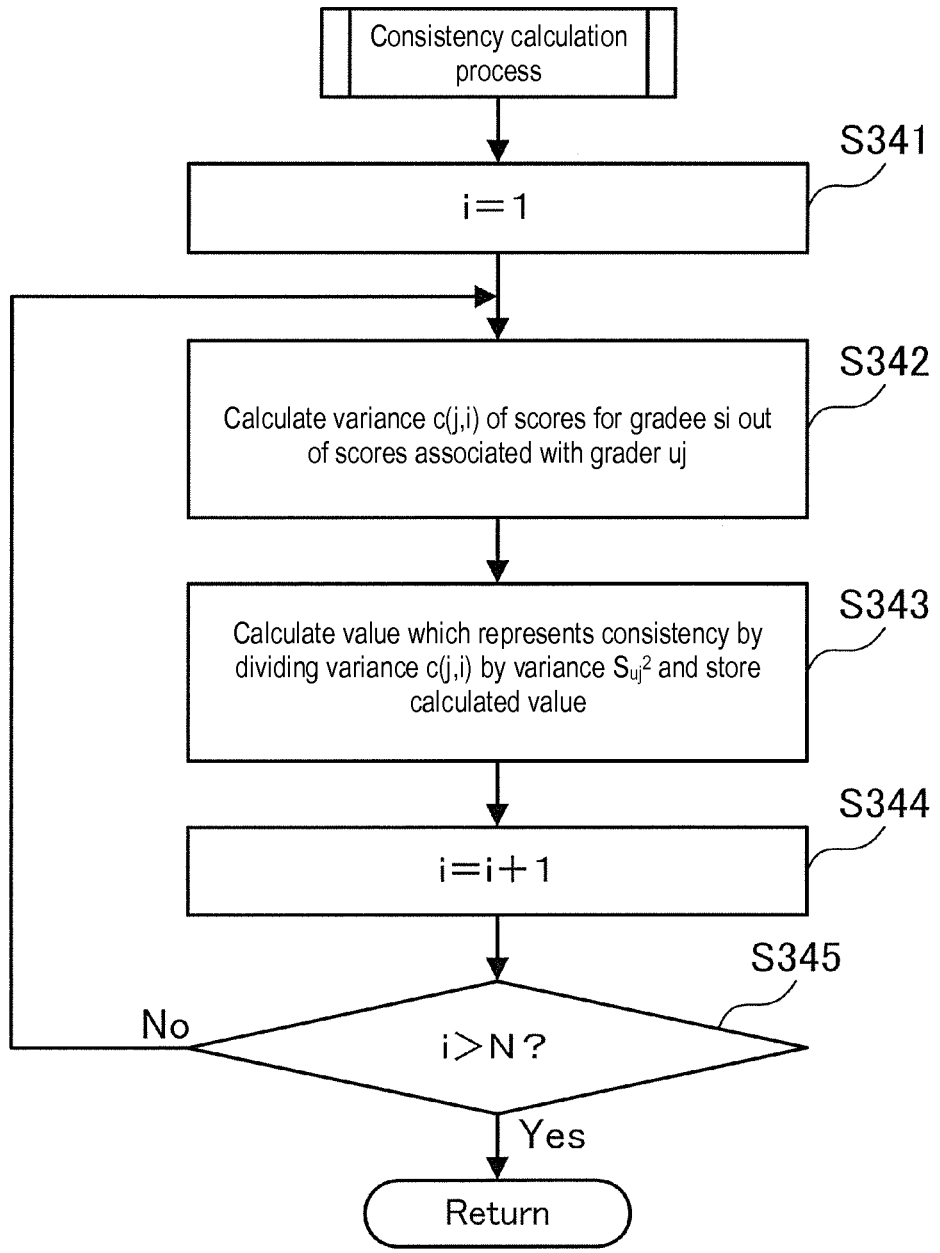
FIG. 16 is a flowchart showing an operation example of the server included in the reputation analysis apparatus according to an embodiment.

FIGS. 14 to 16 are flowcharts showing an operation example of the server 30. Note that this operation is started when the command acceptance unit 31 receives an analysis command. However, this operation may be started at the time point when a notice that grading information is stored in the database 50 is received from the crawler 20 or at a predetermined time point after the grading information is stored in the database 50.

When the operation starts, first, the consensus calculation unit 32 substitutes 1 for variable i used to count the gradees as shown in FIG. 14 (block 301). Then, by referring to the first grading information stored in the database 50, the consensus calculation unit 32 calculates the variance $S_{si}^2$ of scores associated with the gradee si (block 302). Subsequently, the consensus calculation unit 32 increments the variable i by 1 (block 303), and determines whether the value of the variable i has exceed N (block 304). If it is determined that the value of the variable i has not exceed N, the processing returns to block 302, but if it is determined that the value of the variable i has exceed N, the processing advances to block 305. Finally, the consensus calculation unit 32 calculates an average value of variances $S_{s1}^2, S_{s2}^2, \ldots, S_{sN}^2$ for gradees s1, s2, ..., sN (block 305). Then, the consensus calculation unit 32 divides the variances for the respective gradees calculated in block 302 by the average value calculated in block 305, thereby calculates a value which represents consensus on the grading for each gradee, and stores the calculated values in the database 50 (block 306).

Next, as shown in FIG. 15, the distinctiveness calculation unit 33 substitutes 1 for variable j used to count the graders (block 321). Then, by referring to the first grading information and second grading information stored in the database 50, the distinctiveness calculation unit 33 calculates the variance $S_{uj}^2$ of scores associated with the grader uj (block 322). Also, the consistency calculation unit 34 performs a consistency calculation process described later (block 340). Subsequently, the distinctiveness calculation unit 33 increments the variable j by 1 (block 323) and determines whether the value of the variable j has exceed M (block 324). If it is determined that the value of the variable j has not exceed M, the processing returns to block 322, but if it is determined that the value of the variable j has exceed M, the processing advances to block 325. Finally, the distinctiveness calculation unit 33 calculates an average value of variances $S_{u1}^2, S_{u2}^2, \ldots, S_{uM}^2$ for graders u1, u2, ..., uM (block 325). Then, the distinctiveness calculation unit 33 divides the variances for the respective graders calculated in block 322 by the average value calculated in block 325 thereby calculates a value which represents distinctiveness of the grading by each grader, and stores the calculated values in the database 50 (block 326).

Now, the consistency calculation process in block 340 of FIG. 15 will be described. In the consistency calculation process, first, the consistency calculation unit 34 substitutes 1 for variable i used to count the gradees as shown in FIG. 16 (block 341). Also, by referring to the first grading information and second grading information stored in the database 50, the consistency calculation unit 34 calculates variance c(j,i) of the scores for the gradee si out of the scores associated with the grader uj (block 342). As in the case of the gradings given by the graders u2 and u4 to the gradee s3 shown in FIGS. 12 and 13, when a certain gradee is graded and given scores by a certain grader multiple times, the variance of the scores is calculated. Then, the variance c(j,i) is divided by the variance $S_{uj}^2$, thereby calculating a value which represents consistency, and the calculated value is stored in the database 50 (block 343). Subsequently, the consistency calculation unit 34 increments the variable i by 1 (block 344), and determines whether the value of the variable i has exceed N (block 345). If it is determined that the value of the variable i has not exceed N, the processing returns to block 342, but if it is determined that the value of the variable i has exceed N, the processing returns to FIG. 15.

FIG. 17 is a diagram showing an example of a data structure in which values that represent consensus, distinctiveness, and consistency are stored in the database 50. As illustrated in FIG. 17, in this data structure, the cell at the intersection of the consensus row with the column of each gradee contains the value which represents consensus on the grading for the gradee. Also, the cell at the intersection of the distinctiveness column with the row of each grader contains the value which represents the distinctiveness of grading by the grader. Furthermore, the cell at the intersection of each grader row with each gradee column contains the value which represents the consistency of the grading given by the grader to the gradee.

With the values which represent consensus, distinctiveness, and consistency being stored in the database 50 in this way, when the command acceptance unit 31 accepts an information output command, the information output unit 35 outputs the values which represent consensus, distinctiveness, and consistency to the user interface 40. In this case, any mode for outputting the values which represent consensus, distinctiveness, and consistency may be adopted.

For example, as shown in FIG. 18, when a user selects, on a screen, a gradee whose reputation the user wants to analyze, it is conceivable to output the value which represents consensus on the grading for the gradee, the value which represents distinctiveness of grading by the grader who has graded the gradee, and the value which represents consistency of the grading for the gradee graded by the grader who has graded the gradee.

In FIG. 18, gradee s1003 surrounded by a heavy line is selected as an evaluation target. Then, analysis results here shows the following. That is, since the Consensus field of gradee s1003 contains "12.815195", it can be seen that the consensus on the grading for gradee s1003 is high. Also, since the Distinctiveness field of grader u1004 contains "266.0389", it can be seen that the distinctiveness of the grading by grader u1004 is high. Furthermore, since the Consistency field of grader u1004 contains "0.34526494", it can be seen that the consistency of the grading by grader u1004 for gradee s1003 is high. Based on these values and correspondence shown in FIG. 6, it is estimated that the grading by grader u1004 for gradee s1003 is attributable to an external cause.

Alternatively, the output produced may be an attributable cause of reputation (which cause the reputation is attributed to, an internal cause, external cause, or situational cause) defined in advance for a combination of consensus, distinctiveness, and consistency levels, information as to whether or not the reputation is a rumor, or the like. Specifically, it is determined whether consensus, distinctiveness, and consistency are high or low by holding a threshold used to determine whether the consensus is high or low, a threshold used to determine whether the distinctiveness is high or low, and a threshold used to determine whether the consistency is high or low in advance and comparing the values which represent the consensus, distinctiveness, and consistency with the respective thresholds. Then, with reference to the correspondence shown in FIG. 6, information about an attributable cause or information as to whether or not the reputation is a rumor is identified and outputted to the user interface 40, where the information is associated with a combination of high/low levels of consensus, distinctiveness, and consistency.

As described above, according to the present embodiment, first, N gradees are selected from among all the gradees at the SNS site, the M graders who have graded any of the N gradees are identified, and the L gradees graded by any of the M graders are identified. Next, the value which represents consensus on the grading for each of the N gradees, the value which represents distinctiveness of the grading by each of the M graders in consideration of the gradings for the L gradees, the value which represents consistency of the grading for each of the N gradees by each of the M graders in consideration of the gradings for the L gradees are calculated, and information based on these values are outputted. This makes it possible to analyze evaluations found on internet media accurately and efficiently even if an evaluation which appears to be a rumor is included.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A method comprising:
   obtaining, by a web crawler, evaluation data comprising word evaluation data;
   grading, using text mining, the word evaluation data by converting positive and negative expressions into numerical form to generate a set of grading data, wherein the grading is performed by a set of graders, the grading is applied to a set of gradees, and the data obtained from the grading is a set of grading data;
   storing, in a database, the grading data;
   determining a consensus value of the grading data by dividing a dispersion degree of the grading data for a subset of the gradees by a central value of the grading data for the set of gradees;
   determining a distinctiveness value of the grading data by dividing a dispersion degree of a subset of the grading data, wherein the subset of the grading data is a set of grading data generated by a particular grader by a central value of the set of grading data wherein the set of grading data is data provided by the set of graders;
   determining a consistency value by dividing a second subset of grading data, wherein the second subset of grading data is a set of data generated by the particular grader for the particular gradee by the dispersion degree of the set of grading data generated by the particular grader;
   determining, based on at least one of the group consisting of: the consensus value, the distinctiveness value, and the consistency value, that the word evaluation data is a rumor;
   storing, in the database, the consensus value, the distinctiveness value, the consistency value, and the determination that the word evaluation data is the rumor; and
   outputting, to a user interface, the stored values and the determination that the word evaluation data is the rumor.

2. A computer system for supporting analysis of evaluations found on the internet, the system comprising:
   a memory; and
   a processor, communicatively coupled to said memory, the computer system configured to perform a method comprising:
   obtaining, by a web crawler, evaluation data comprising word evaluation data;
   grading, using text mining, the word evaluation data by converting positive and negative expressions into numerical form to generate a set of grading data, wherein the grading is performed by a set of graders, the grading is applied to a set of gradees, and the data obtained from the grading is a set of grading data;
   storing, in a database, the grading data;
   determining a consensus value of the grading data by dividing a dispersion degree of the grading data for a subset of the gradees by a central value of the grading data for the set of gradees;
   determining a distinctiveness value of the grading data by dividing a dispersion degree of a subset of the grading data, wherein the subset of the grading data is a set of grading data generated by a particular grader by a central value of the set of grading data wherein the set of grading data is data provided by the set of graders;
   determining a consistency value by dividing a second subset of grading data, wherein the second subset of grading data is a set of data generated by the particular grader for the particular gradee by the dispersion degree of the set of grading data generated by the particular grader;
   determining, based on at least one of the group consisting of: the consensus value, the distinctiveness value, and the consistency value, that the word evaluation data is a rumor;
   storing, in the database, the consensus value, the distinctiveness value, the consistency value, and the determination that the word evaluation data is the rumor; and outputting, to a user interface, the stored values and the determination that the word evaluation data is the rumor.

3. The system of claim 2, wherein the method further comprises:
generating causal attribution data;
analyzing, using Kelley's Analysis of Variance Model, the causal attribution data; and
outputting, to the user interface and for display, the analyzed causal attribution data.

* * * * *